UNITED STATES PATENT OFFICE.

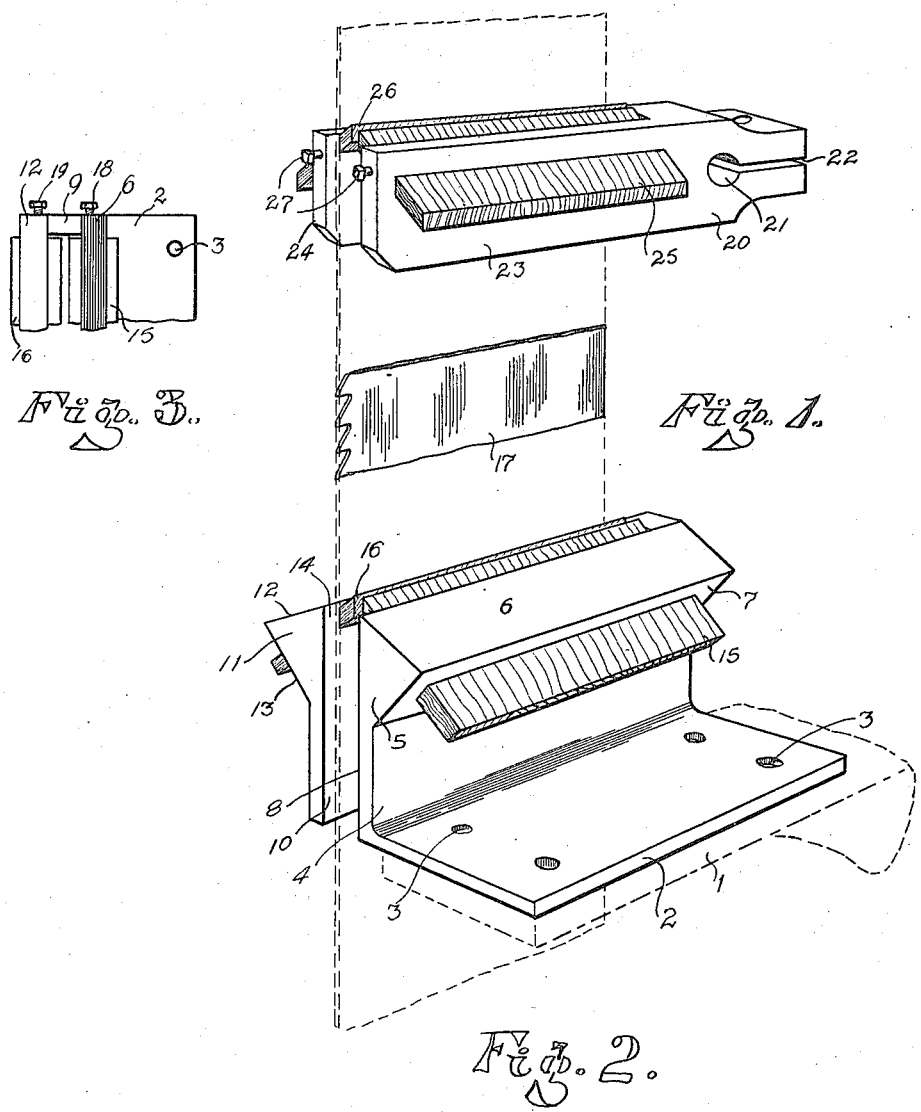

HERMAN WOELFFER, OF WEST DULUTH, MINNESOTA.

SAW-GUIDE.

1,157,607.  Specification of Letters Patent.  Patented Oct. 19, 1915.

Application filed December 12, 1914. Serial No. 876,852.

*To all whom it may concern:*

Be it known that I, HERMAN WOELFFER, a citizen of the United States, residing at West Duluth, in the county of St. Louis and State of Minnesota, have invented certain new and useful Improvements in Saw-Guides, of which the following is a specification, reference being had therein to the accompanying drawing.

My invention relates to improvements in saw guides the primary object of which is to devise a guide particularly adapted to be used with band saws which will accurately aline and guide the saw.

Another object of the invention is to devise such a device which is efficient, simple and cheap of manufacture.

Another object of the present improvement is to provide a guide for band saws provided with adjustable guide blocks which are adapted to prevent any foreign substance from getting in between the guides and the saw blades.

Another object of the present improvement is to construct a guide having guide blocks made of material of less wearing durability than the saw blade and arranging the said blocks so as to be adjustable whereby the said blocks may be adjusted as they become worn through engagement with the saw blade.

Other objects and advantages of the present improvement will be set out in detail in the following specification and drawings in which—

Figure 1 is a perspective view of my improved uppermost saw-guide. Fig. 2 is a similar view of the lowermost saw-guide. Fig. 3 is a top plan view of a fragmental portion of the rear end of the lower guide.

Referring now to the drawings in which like reference numerals designate similar parts, 1 represents a saw bed of the usual construction upon which it is customary to bolt whatever form of guide is used. This bed usually extends upon but one side of the saw in order to provide free and unobstructed passage of the log carriage upon the other side thereof.

My saw guide comprises two guide members one arranged above the other and parallel to each other.

The lower guide consists of a base plate 2 which is designed to be securely fastened, preferably by bolts within suitable holes 3, to the saw bed above referred to. The said base is provided at its inner end with a right angular wall integral therewith and extending upwardly and terminating in a laterally enlarged angular portion 5. This portion 5 comprises a downwardly inclined surface 6 and an upwardly inclined surface 7, the inner face 8 of the portion 5 being a continuation of and in the same plane as the inner vertical face of the wall 4. One end of the vertical wall 4 extends outwardly in a horizontal plane and at right angles to the said wall forming an end wall 9 integral therewith. This end wall 9 carries a vertical wall 10 of the same size and shape as the vertical wall 4 and arranged parallel to the said wall 4. The upper end of this wall 10 is provided with an angular portion 11 exactly similar to the angular portion 5 and consists of angular faces 12 and 13 and a vertical face 14 integral with and in the same plane as the inner side of the wall 10. The angular portions 5 and 11 above referred to are provided with inclined openings of rectangular cross section within which are mounted guide blocks 15 and 16 which engage the saw blade and together with the portion 9 are designed to surround the saw blade on three sides as is clearly illustrated. The saw blade in the illustration is designated by the numeral 17. The portions 4 and 10 and the angular portions 5 and 11 are preferably formed of cast metal and are formed together with the base 2 into one casting. The guide blocks 15 and 16 are made of wood and may be either composed of a single piece, as shown, or of a number of pieces. They are placed in the inclined rectangular openings formed in the angular portions 5 and 11, the openings being so positioned as to cause the guide blocks when placed therein to protrude upwardly to a point very close to the uppermost edge or terminus, of the said angular portions and to protrude outwardly approximately centrally through the lower faces 7 and 13 of the said angular portions. The position of these blocks is secured through the fact that the openings are inclined as will be readily understood.

The upper guide comprises a cast member 20 having a suitable hole 21 transverse the end thereof providing a means for supporting it, forming a bearing for a shaft (not shown) for supporting said guide to the saw frame. The shaft is designed to snugly fit and be clamped in the casting in any desired manner. I have here illustrated the casting 20 as being bifurcated, the hole 21 as at 22 providing a means whereby the bifurcated ends may be clamped together and thereby clamping the shaft in the opening 21. In front of the hole 21 the casting 20 is bifurcated vertically and formed into two rectangular shaped vertically elongated members 23 and 24 each of which is formed with an inclined opening similar to that within the angular portions 5 and 11 of the lowermost guide and in which openings are mounted wooden guide blocks 25 and 26 which are practically identical with the blocks 15 and 16 of the lower guides.

The blocks in both guides are readily adjustable to and from the saw blade and are held in any adjusted position by set screws. The lower blocks 15 and 16 are held by set screws 18 and 19 which are screw-threaded through the end wall 9 of the guide supports and are designed to impinge against the edges of the guide blocks to hold them in place. Set screws 26 and 27 are similarly arranged to clamp the blocks 25 and 26 of the upper guide in any desired position.

The object of arranging the blocks 15 and 16 mounted within angular members 5 and 11 very close to the upper edge of the guide is for the purpose of providing as smooth and unobstructed inclined surface to the guides as possible, to admit the free passage of sawdust or slivers therefrom.

I am aware that blocks of wood have been adjustably mounted within standards for saw guides, but I claim that I am the first to construct a standard of the particular form and simple construction shown in my present invention, whereby a wooden guide block extends across the entire surface of the saw and in which the saw is nearly surrounded by metal walls whereby perfect alinement of the saw blade is maintained and danger of accident is reduced to the minimum.

Having thus fully described my invention what I claim and desire to secure by Letters Patent is:

1. A guide for band saws comprising a continuous blade engaging member upon each side of the saw, said members being held in an upwardly inclined position relative to the saw and being of a thickness less than one-tenth the width thereof.

2. A band saw guide comprising a bifurcated support composed of a single piece of metal, elongated inwardly and upwardly inclined slots within the walls of the bifurcated portion of the support, wooden blocks adjustably mounted within the slots and designed to engage the saw blade and being of a thickness not exceeding one tenth the width thereof.

3. A band saw guide comprising a bifurcated support composed of a single piece of metal, the upper terminus of each half of the support being formed into a laterally projecting angularly shaped housing for the adjustable guide for the saw, and the lower portion of one half of the support having formed integral therewith a laterally projecting flange by which the entire support is securely held in place.

In testimony whereof I hereunto affix my signature in the presence of two witnesses.

HERMAN WOELFFER.

Witnesses:
CECILIA G. DUNN,
A. C. DUNN.

Copies of this patent may be obtained for five cents each, by addressing the "Commissioner of Patents, Washington, D. C."